United States Patent
Guha et al.

(10) Patent No.: US 10,462,681 B2
(45) Date of Patent: Oct. 29, 2019

(54) METHOD AND USER EQUIPMENT (UE) FOR CELL RESELECTION IN CONNECTED MODE THEREOF

(71) Applicant: Samsung Electronics Co., Ltd., Suwon-si, Gyeonggi-do (KR)

(72) Inventors: Shouvik Guha, Bangalore (IN); Manvir Singh Dhiman, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/949,941

(22) Filed: Apr. 10, 2018

(65) Prior Publication Data

US 2018/0295527 A1 Oct. 11, 2018

(30) Foreign Application Priority Data

Apr. 10, 2017 (IN) .............................. 201741012762
Jan. 31, 2018 (IN) .............................. 201741012762

(51) Int. Cl.
*H04W 16/32* (2009.01)
*H04W 24/08* (2009.01)
(Continued)

(52) U.S. Cl.
CPC ........... *H04W 16/32* (2013.01); *H04W 24/08* (2013.01); *H04W 36/04* (2013.01); *H04W 36/30* (2013.01);
(Continued)

(58) Field of Classification Search
CPC ..... H04W 16/32; H04W 24/08; H04W 36/04; H04W 36/30; H04W 72/0406; H04W 8/08; H04W 36/14; H04W 88/06
See application file for complete search history.

(56) References Cited

U.S. PATENT DOCUMENTS

2011/0081903 A1*  4/2011  Cai ................... H04W 36/0058
                                                              455/424
2012/0176923 A1    7/2012  Hsu et al.
(Continued)

FOREIGN PATENT DOCUMENTS

KR   10-2013-0130351 A   12/2013
WO      2015/066476 A1    5/2015
WO      2016/069211 A1    5/2016

OTHER PUBLICATIONS

International Search Report dated Jul. 16, 2018 in connection with International Patent Application No. PCT/KR2018/004210.
(Continued)

*Primary Examiner* — Duc C Ho

(57) ABSTRACT

Accordingly the embodiments herein disclose a method for cell reselection by UE in a connected mode. The method includes measuring signal strength of neighboring cells in one or more inter-radio access technology (inter-RAT) frequencies while camped on a serving cell in the connected mode. Further, the method includes determining power class (PC) capability of the neighboring cells by scanning a band corresponding to the Evolved Absolute Radio Frequency Channel Number (EARFCN) of the neighboring cells, by reading SIB from neighboring cell, by reading a control channel message. Furthermore, the method includes reselecting to a neighboring cell using the determined power class capability when the measured signal strength of the neighboring cell meets the pre-defined reselection threshold.

20 Claims, 10 Drawing Sheets

(51) Int. Cl.
  *H04W 36/04* (2009.01)
  *H04W 72/04* (2009.01)
  *H04W 36/30* (2009.01)
  *H04W 8/08* (2009.01)
  *H04W 88/06* (2009.01)
  *H04W 36/14* (2009.01)
(52) U.S. Cl.
  CPC .......... *H04W 72/0406* (2013.01); *H04W 8/08* (2013.01); *H04W 36/14* (2013.01); *H04W 88/06* (2013.01)

(56) References Cited

U.S. PATENT DOCUMENTS

| | | | |
|---|---|---|---|
| 2013/0182583 A1 | 7/2013 | Siomina et al. | |
| 2013/0223235 A1* | 8/2013 | Hu | H04W 36/04 370/242 |
| 2013/0258883 A1* | 10/2013 | Vargas Bautista | H04W 36/0094 370/252 |
| 2014/0036874 A1 | 2/2014 | Jeong et al. | |
| 2014/0098693 A1* | 4/2014 | Tabet | H04W 36/0083 370/252 |
| 2015/0079971 A1* | 3/2015 | Goldhofer | H04W 28/0268 455/422.1 |
| 2015/0092670 A1 | 4/2015 | Makhlouf et al. | |
| 2016/0127956 A1* | 5/2016 | Jujaray | H04W 36/0066 455/437 |

OTHER PUBLICATIONS

Written Opinion of the International Searching Authority dated Jul. 16, 2018 in connection with International Patent Application No. PCT/KR2018/004210.

* cited by examiner

METHOD AND USER EQUIPMENT (UE) FOR CELL RESELECTION IN CONNECTED MODE THEREOF

CROSS-REFERENCE TO RELATED APPLICATIONS AND CLAIM OF PRIORITY

This application is based on and claims priority under 35 U.S.C. § 119 to Indian Patent Application Serial No. 201741012762 (PS) filed in the Indian Patent Office on Apr. 10, 2017 and Indian Patent Application Serial No. 201741012762 (CS) filed on Jan. 31, 2018, the disclosures of which are incorporated herein by reference in their entireties.

BACKGROUND

The present disclosure relates to a wireless communication and more specifically to a method and UE for cell reselection in connected mode thereof.

In general, wireless communication systems are widely deployed to provide various types of communication services such as voice, data, and so on. These wireless communication systems may be multiple-access systems capable of supporting communication with multiple users by sharing the available system resources (e.g., bandwidth and transmit power). Generally, a wireless multiple-access communication system can simultaneously support communication for multiple wireless terminals. Each terminal communicates with one or more base stations.

Operators with Time Division Duplex (TDD) based LTE deployment may have High Power User Equipment (HPUE) (Power Class 2) standardized for a TDD Band 41 in the 3$^{rd}$ Generation Partnership Project (3GPP). Further 3GPP has open study items for enabling the HPUE in other bands. The User Equipment (UE) can transmit up to 26 dBm in case of PC2 (instead of 23 dBm in PC3). The high transmit Power Class 2 (PC2) feature helps in coverage enhancement of the PC2 capable eNB by up to ~30%. Hence, the HPUE is expected to remain in PC2 cells for a longer period of time compared to non HPUE devices. This is achieved by Pcompensation (one of the factor used in LTE cell selection as per 3GPP 36.304) difference between HPUE and non HPUE device.

However, there exists problem in current UE implementation which might negate the advantages of PC2 cells. These issues are explained as below:
  a. 3GPP/3GPP2 standards define methods of Active mode handovers from eHRPD to LTE, but Mobile Network Operator (MNO) have not implemented due to additional overhead of new interfaces required for the same.
  b. There are methods for Active eHRPD to LTE transition which periodically monitors LTE RAT when eHRPD is in connected state and force the UE(s) to switch to LTE without the need of additional network (NW) interfaces. However, following are the drawbacks of the same.
  c. PC2 UE capabilities of device do not get automatically handled for handovers (like UMTS<->LTE or similar IRAT mobility).
  d. There is no special handling of PC2 based devices in the aforesaid method for Active eHRPD to LTE transition.
  e. So the devices supporting HPUE would NOT be able to take advantage of B41 PC2 during eHRPD<->LTE mobility scenarios.
  f. User and operator experience could be devoid due to HPUE gains (may remain on eHRPD fr longer duration, poor TPUT etc.).

It is well known that with PC2 network, the device(s) will have a 3 dBm of gain in their cell coverage.

For example, consider a scenario in which the UE is in mobility and is moving towards LTE PC2 cell coverage and eHRPD is in connected state. At first, the UE, in eHRPD connected state, can be configured to scan for LTE regularly (for example, LTE scan for every 60 sec) and shall acquire LTE service when LTE RSRP>a predefined threshold (i.e., -108 dBm) (as shown in FIG. 1A).

Referring to FIG. 1A, if at area(x) there is no LTE coverage then, the UE will obtain eHRPD services as per the standard communication protocol. Further, when the UE moves to area(y), then the UE starts scanning the neighboring LTE cells, but cannot acquire LTE services as LTE RSRP of the neighbor LTE cell is <-108 dBm. Furthermore, when the UE moves to area (z), the UE, finally, acquires the LTE services as the LTE RSRP of the neighbor LTE cell is >-108 dBm.

Active eHRPD to LTE transition Feature: Referring to FIG. 1A, if the UE is in a connected state on a less preferred system, then the UE can scan for more preferred LTE system without waiting for current data connection to go dormant/idle. Current Active eHRPD to LTE transition feature works as per below parameters (Table 1).

TABLE 1

| Active eHRPD to LTE transition Parameters | Description |
| --- | --- |
| serving_threshold | ECIO of serving eHRPD is below this value |
| Target_threshold | Reference Signal Received Power (RSRP) of LTE cell is above this value |
| scan_interval | LTE/Target cell scan periodicity |

Consider another scenario, in which the UE is in eHRPD connected state and now moved to an area where LTE PC2 cell with weak signal is present, then the UE stays in this area (Stationary Scenario). At first, the UE, in eHRPD connected state, can be configured to scan for LTE regularly (for example, LTE scan for every 60 sec) and shall acquire LTE service when LTE RSRP>-108 dBm (as shown in FIG. 1B).

Referring to FIG. 1B, due to the weak LTE PC2 cell with weak signal at area(Y), the UE will never acquire LTE services even when LTE can be sustained at this RSRP as per HPUE.

Thus, it is desired to overcome a shortcoming described in the aforementioned scenarios.

The above information is presented as background information only to help the reader to understand the present disclosure.

The principal object of the embodiments herein is to provide a method and UE for cell reselection in a connected mode thereof.

Another object of the embodiments herein is to provide a method for determining power class (PC) capability of the neighboring cells based on a band of the one or more inter-RAT frequencies.

Another object of the embodiments herein is to provide a method for reselecting to a neighboring cell using the determined power class capability when the measured signal strength of the neighboring cell meets the pre-defined reselection threshold.

Another object of the embodiments herein is to provide an Active eHRPD to LTE transition feature enhancement for a HPUE device.

Another object of the embodiments is to identify neighbor LTE cells supporting PC2 in an eHRPD connected state.

Another object of the disclosure is to dynamically change the LTE threshold criteria for transitioning to LTE PC3 or PC2 neighbor cells.

SUMMARY

The present disclosure is directed towards a method for providing an optimized cell reselection by an UE, more particularly a method for reselecting and/or transitioning to a cell that supports LTE (i.e., 4G network) from active eHRPD (i.e., 3G network). In some instances, where measurement of the inter-RAT frequencies i.e., neighboring cells is used during UE mobility/transition, the proposed method during this instances can be used to determine power class (PC) capability of the neighboring cells based on a band of the one or more inter-RAT frequencies. Thus, the proposed method can leverage the PC capability of the neighboring cells in determining and/or reselecting a neighboring cell when the measured signal strength of the neighboring cell meets the pre-defined reselection threshold.

In an embodiment, determining the PC capability of the neighboring cells comprises scanning a band corresponding to the Evolved Absolute Radio Frequency Channel Number (EARFCN) of the neighboring cells.

In an embodiment, the method further comprises storing the determined PC capability of the neighboring cells, wherein the UE reselects to the neighboring cell using the stored PC capability of the neighboring cell.

In an embodiment, determining the PC capability of the neighboring cells includes acquiring System Information Block Type (SIB) from the neighboring cell, and reading the SIB to determine the PC capability of the neighboring cell in the SIB.

In an embodiment, determining the PC capability of the neighboring cells includes receiving other RAT neighbor list (ORNL) message in the connected mode, where the ORNL message is broadcasted by a base station of the serving cell, and reading the ORNL message to determine the PC capability of the neighboring cells.

In an embodiment, a signal strength threshold for reselection to the neighboring is reduced by determining PC capability of the neighboring cells.

Accordingly the embodiments herein disclose a UE for cell reselection in a connected mode. The UE includes a memory configured to store data and at least one processor. The at least one processor is configured to identify signal strength of neighboring cells in one or more inter-radio access technology (inter-RAT) frequencies while camped on a serving cell in the connected mode. Further, the at least one processor configured to determine power class capability of the neighboring cells based on a band of the one or more inter-RAT frequencies. Furthermore, the at least one processor configured to control to reselect to a neighboring cell using the determined power class capability when the identified signal strength of the neighboring cell meets the pre-defined reselection threshold.

These and other aspects of the embodiments herein will be better appreciated and understood when considered in conjunction with the following description and the accompanying drawings. It should he understood, however, that the following descriptions, while indicating various embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
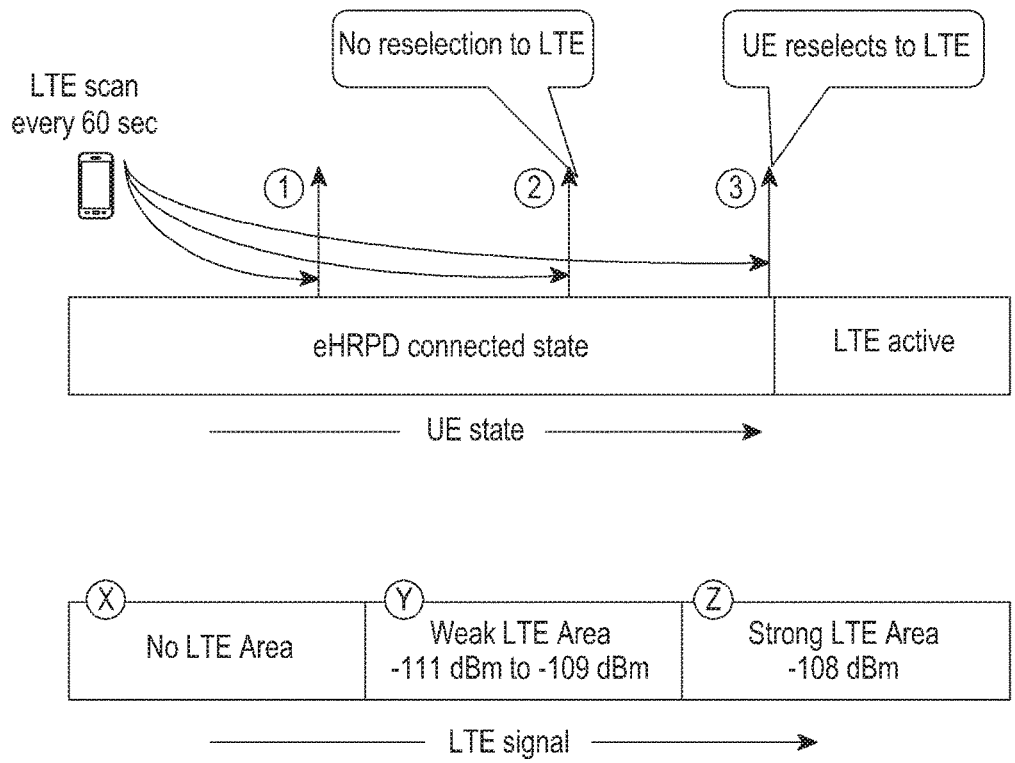
FIGS. 1A and 1B illustrate an example scenario in which UE in active eHRPD state is unable to acquire LTE services, according to prior art.

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will now be described in detail with reference to he accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually, exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may he implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein disclose a method for cell reselection by UE in a connected mode. The method includes measuring signal strength of neighboring cells in one or more inter-radio access technology (inter-RAT) frequencies while camped on a serving cell in the connected mode. Further, the method includes determining power class (PC) capability of the neighboring cells based on a band of the one or more inter-RAT frequencies. Furthermore, the method includes reselecting to a neighboring cell using the determined power class capability when the measured signal strength of the neighboring cell meets the pre-defined reselection threshold. In an example, the pre-defined reselection threshold can be from −108 dBm to −111 dBm. With the proposed method, when the signal strength i.e., LTE RSRP>−108 dBm, (pre-defined reselection threshold), the LE reselects to the neighboring cell. The above mentioned threshold values are provided for better understanding of the embodiments described herein. However, it should be noted that the threshold values may vary based on the network deployment.

With proposed method, the UE can reselect to LTE cell for up to −111 dBm, by virtue of the 3 dBm gain obtained using PC2 capable cell.

Although the embodiments herein are described with respect to active eHRPD to LTE transition, it is to be noted that the embodiments herein are applicable any RAT to a preferred RAT transition.

Unlike conventional methods and conventional systems, the proposed method can be used to determine the power class (PC) capability of the neighbor cell (e.g., target cell) during the UE cell reselection instances(i.e., during transition from active eHRPD to LTE).

Unlike conventional methods and conventional systems, where the transition from the active eHRPD to LTE is based on timers and common thresholds for all LTE system transition, the proposed method considers the PC capability of target LTE cell during inter RAT transitions from active eHRPD to LTE.

Unlike conventional methods and conventional systems, the proposed method can be used to leverage the advantages of PC2 cells. For example, the proposed method can allow the UE to effectively utilize the increased gain of 3 dBm (provide by the PC2 cell) in order to rapidly acquire the HPUE services i.e., allowing the UE to scan for LTE while in eHRPD connected state. Thus, enhancing the eHRPD<->LTE mobility to consider PC2 based devices and to utilize the gains of HPUE to users and operators. Further, the proposed method can be used for any mobility situation where the UE intends to move to a preferred RAT while UE is in connected mode on a less preferred RAT in multi power class deployment network.

Referring now to the drawings, and more particularly to FIGS. 2 through 8, where similar reference characters denote corresponding features consistently throughout the figures, these are shown various embodiments.

Figure 2A:
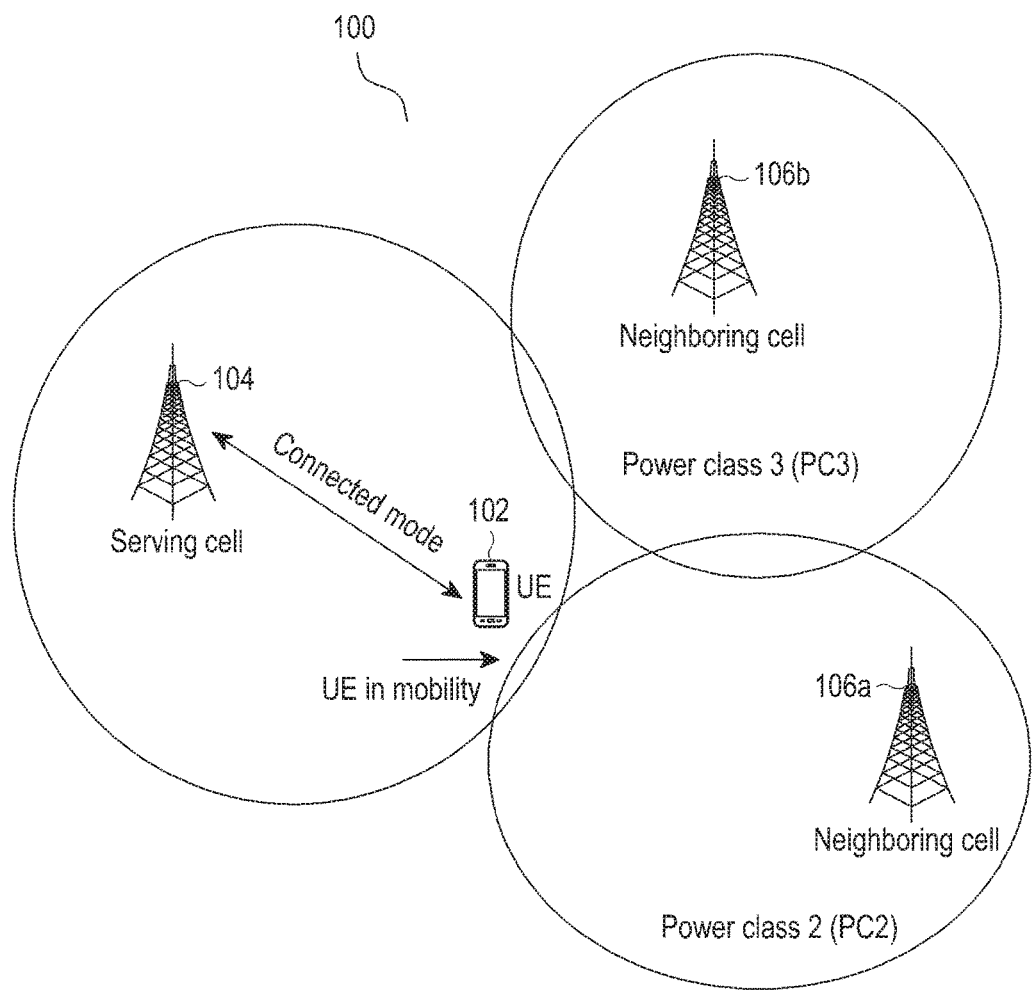
FIG. 2A illustrates a wireless communication system in which the UE performs a cell reselection procedure while in connected mode, according to embodiments as disclosed herein.

FIG. 2A illustrates a wireless communication system 100 in which a UE 102 performs a cell reselection with neighboring procedure while in connected mode, according to embodiments as disclosed herein.

The wireless communication system 100 includes the LTE 102, a serving cell 104, a neighbor cell 106a and 106b (hereinafter may be used as a neighbor cell 106).

The term "neighbor" and "neighboring" are used interchangeably throughout the description.

In an embodiment, the UE 102 can include, for example, cellular telephones, smartphones, mobile stations, personal computers (PCs) and minicomputers, whether desktop, laptop, or otherwise, as well as mobile devices such as handheld computers, PDAs, personal media devices (PMDs), or the like. According to one of the aspect of this disclosure the UTE 102 can be a HPUE device.

The UE 102 may support multiple Radio access technologies (RAT) such as, for example, CDMA 1XA, GPRS, EvDO, TDMA, GSM, WiMax technology, LTE, LTE Advanced, eHRPD, and the like. Alternatively, the UE 102 may support one type of technology, such as LTE (LTE and/or LTE Advanced), and more specifically may utilize voice-over LTE (VoLTE) for voice calls.

The UE 102 may include a client application allowing the UE 102 to carry out a transition to a different network (i.e., inter-RAT). More particularly, reselecting of the neighbor cell using inter-RAT frequency. As used herein, the reselection of the cell by the UE 102 is the process of transferring an active call or data session of the UE 102 from a serving cell 104 in the wireless communications system 100 to the neighboring cell 106 (i.e., target cell). To be precise, in one embodiment, the reselection of the cell describes the scenario, where the UE 102 transits from one network (i.e., a first RAT) to a different network (i.e., a second RAT) such as from the 3G network to the 4G network, or from the eHRPD network to the LTE network.

Figure 1B:
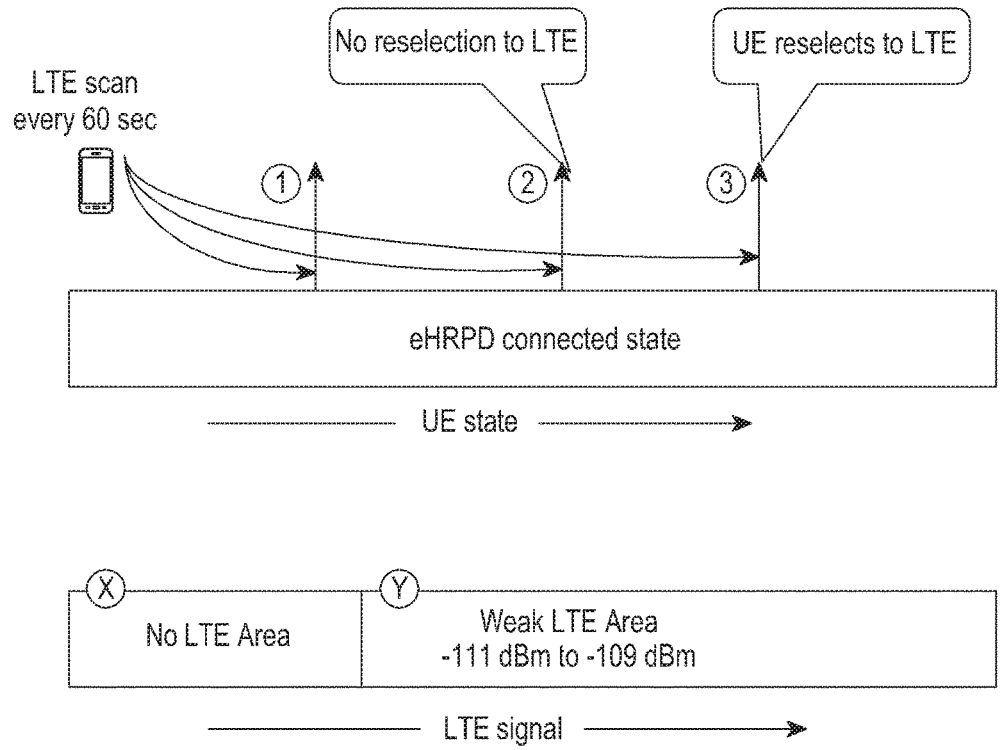

Referring to FIGS. 1A and 1B, two wireless communications networks, including eHRPD and LTE networks that are interlinked such that the UE 102 in any of the two networks is able to transition to another network. For example, the serving cell 104 is configured to support the 3G eHRPD network and the neighboring cell 106 is configured to support the 4G LTE network. In one embodiment, the UE 102 connected to the 3G eHRPD network may attempt to access the 4G LTE network. This may happen when the UE 102 enters an area that has 4G LTE coverage, such as where the neighbor cell 106 is located.

In some instances, the neighboring cell 106 can be configured to support PC3/PC2 capable LTE (as shown in FIGS. 1A and 1B, where neighbor cell 106a supports PC2 capable LTE and the neighbor cell 106b supports PC3 capable LTE). According to the 3GPP standard specification (TR 36.886), the HPUE (i.e., UE 102) can transmit up to 26 dBm on PC2 capable LTE cells, unlike the maximum transmission power of any UE which is restricted to 23 dBm in Power class 3 (PC3) LTE cells.

Hence, in other words PC2 feature helps in coverage enhancement of Time Division Duplexing (TDD) B41 cells by 3 dBm (restricted by current 3GPP standard) which means, the PC2 capable UE can stay on service for longer duration on these cells. Thus, in one aspect of the proposed disclosure, the UE 102 can be configured to measure the PC capability of the neighbor cell 106. For example, the UE 102 can be configured to determine whether the PC capability of the neighboring cell 106 is PC2/PC3. Although the embodiments are described using the PC2/PC3 capability of cells for example illustration, it should be noted that the embodiments may not be restrictive only to PC2/PC3 and or applicable to other power class capabilities as supported by the 3GPP specification.

According to conventional methods and conventional systems, during the cell resection scenario, the UE in eHRPD connected state i.e., connected to the serving cell supporting eHRPD network can scan for the LTE network, but cannot acquires services of LTE network in a weak signal area. Unlike to conventional methods and conventional systems, the proposed UE 102 can be configured to determine the PC of neighboring cell 106 during inter RAT transitions from active eHRPD to LTE. Thus, the UE 102 in connected eHRPD state with serving cell 104 can be configured to scan and camp on the neighbor cell 106 (i.e., PC2 capable LTE) even in the weak signal area of the neighbor cell 106.

Figure 2B:
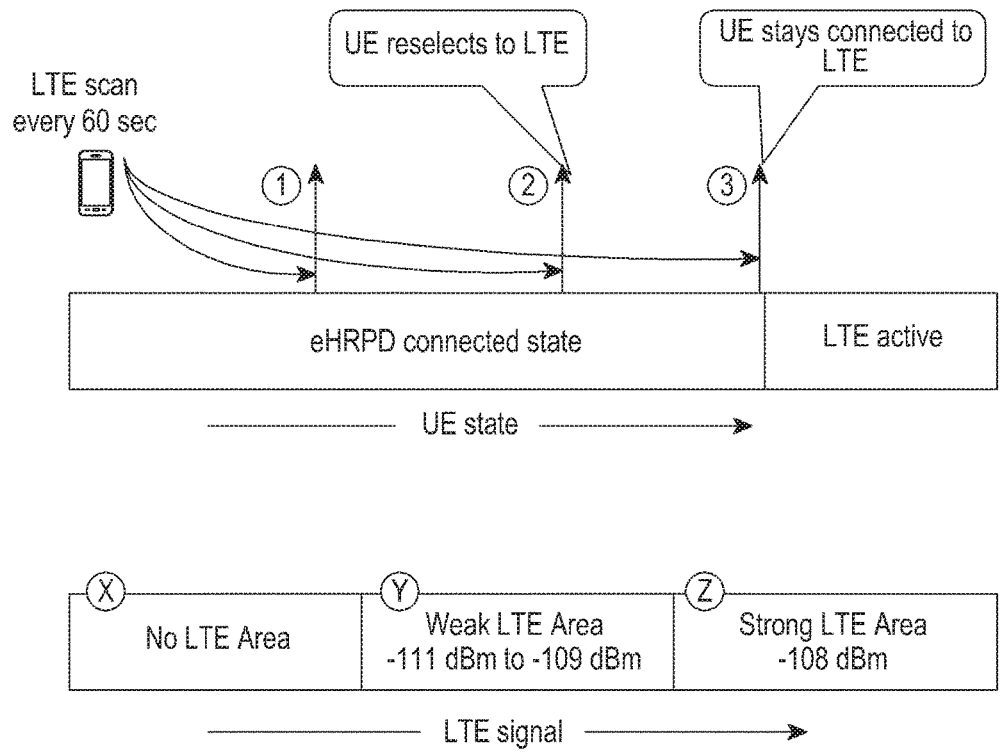
FIG. 2B illustrates an example scenario in which UE in active eHRPD state acquires LTE services, according to an embodiment as disclosed herein.

FIG. 2B illustrates an example scenario in UE 102 in active eHRPD state acquires LTE services, according to an embodiment as disclosed herein. Referring to the FIG. 2B, at area(x) there is no LTE coverage and the UE 102 obtains eHRPD services as per the standard communication protocol. Further, when the UE 102 moves to area(y), then the UE starts scanning the neighboring LTE cells. The UE 102 detects the LTE PC2 cell in the area(y) and reselects to the LTE PC2 cell. Hence, the proposed method allows the UE 102 to effectively utilize the increased gain of 3 dBm (provided by the PC2 cell) in order to rapidly acquire the LTE services.

Further, when the UE 102 moves to area(z) (i,e., strong LTE area), the UE 102 stays connected with LTE service as shown in the FIG. 2B.

Figure 3:
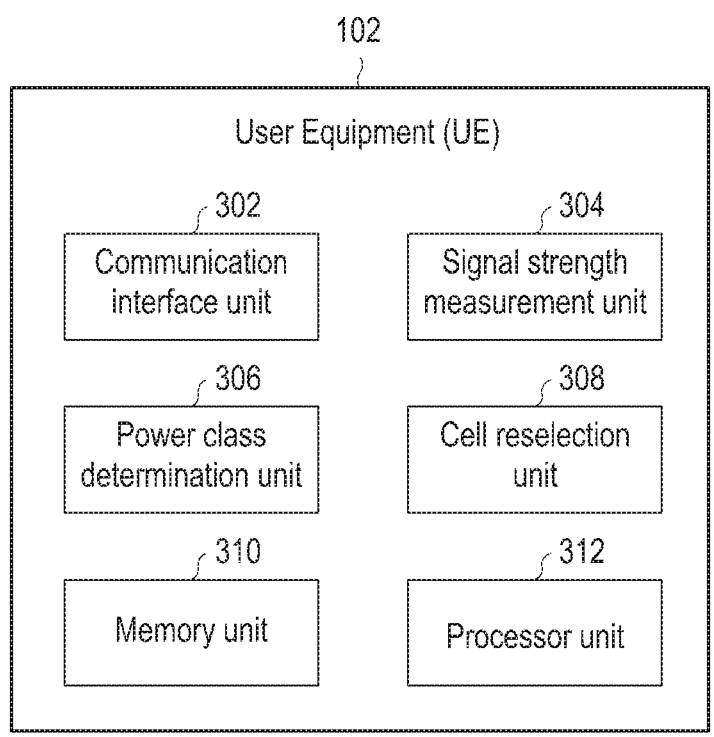
FIG. 3 is a block diagram illustrating various hardware components of the UE for cell reelection in the connected mode, according to embodiments as disclosed herein.

FIG. 3 is a block diagram illustrating various hardware components of the UE 102, according to embodiments as disclosed herein.

In furtherance to the description herein, the UE 102 is considered to be HPUE and the neighboring cell 106b also supports PC2, then reselection criteria to the LTE cell can be eased by 3 dBm.

In an embodiment, the UE 102 incudes, for example, a communication interface unit 302, a signal strength measurement unit 304, a PC determination unit 306, a cell reselection unit 308, a memory unit 310, and a processor unit 312.

In an embodiment, the communication interface unit 302 can be configured to communicate with the serving cell 104 and with the neighboring cells 106a and 106b. For example, in active eHRPD the UE 102 performs data communication with the neighbor cell 106. The communication interface unit 302 can include, a transceiver component comprising an antenna configured to communicate the configuration parameters (SIB messages) with the neighboring cell 106. Further, the antenna can be configured to receive a control channel message(s) (e.g., Other RAT Neighbor List (ORNL) message) from the serving cell 104.

In an embodiment, the signal strength measurement unit 304, operatively coupled with the communication interface unit 302, can be configured to measure(or identify) signal strength of neighboring cell 106 in one or more inter-radio access technology (inter-RAT) frequencies while camped on the serving cell 104 (i.e., connected with the serving cell 104).

In an embodiment, the PC determination unit 306, operatively coupled with the signal strength measurement unit 304, can be configured to determine the PC capability of the neighboring cell 106 based on the band (e.g., Band 41) of the one or more inter-RAT frequencies.

In an embodiment, if the neighbor cell 106a belongs to the band which supports PC2 (i.e., B41 currently) and the UE 102 is currently connected to the serving cell 104, then according to the proposed method the LTE threshold for forced cell reselection is reduced by 3 dBm.

For example, referring to FIG. 1A, if the UE 102 moves to area(y) (i.e., location of the neighboring cell 106a which is LTE PC2 capable) then the UE 102 starts LTE neighbor cell measurements. Unlike to conventional methods and conventional systems, the proposed method can allow the UE 102 to acquire LTE services as the LTE threshold (i.e., relaxing Active eHRPD to LTE transition limits) for forced cell reselection is reduced by 3 dBm (i.e., from LTE RSRP −111 dbm to LTE RSRP −108 dBm, thus meeting the required LTE RSRP threshold i.e., LTE RSRP>−108 dBm). The above mentioned threshold values are provided for better understanding of the embodiments described herein. However, it should be noted that the threshold values may vary based on the network deployment.

Similarly, unlike to FIG. 1B (stuck in active eHRDP scenario), the proposed method can allow the UE 102 to acquire LTD services as the LTE threshold for forced cell reselection is reduced by 3 dBm.

Further, the PC determination unit 306 can be configured to check/read SIB message received through the communication interface unit 302. The SIB message includes the PC capability of the neighboring cell 106. For example, eNB of the neighboring cell 106 can be configured to broadcast the system information i.e., SIB over logical channel BCCH, and further carried over transport channel BCH (or, DL-SCH). The SIB message, in general, carries information of the neighbor cell 106, through which the UE 102 determines the PC capability of the neighbor cell 106.

For example, in the conventional method when the UE is connected to eHRPD and there is no LTE cell available. Now, the UE moves to an area where weak LTE is present (PC2 cell edge). Further, an eHRPD is in connected state and user is stationary (no change in LTE cell signal). Now if the LTE cell power is weak than −108 dBm then even with Active eHRPD to LTE transition UE will not reselect to LTE. But with proposed method, the UE 102 will can reselect to LTE cell for up to −111 dBm, by virtue of the 3 dBm gain obtained using PC2 capable cell.

Further, the PC determination unit 306 can be configured to determine the PC capability of the neighbor cell 106 using the ORNL message (i.e., 3GPP2 ORNL configured by the network) received from the eNB of the serving cell 104. In an embodiment, the ORNL message contains information about neighbor LTE cell 106 including PeMax (indicates power class of the LTE cell), Qrxlevmin (indicates the minimum power level requires to camp onto the cell).

The cell reselection unit 308 can be configured to reselect to the neighboring cell 106 using the determined PC capability when the measured (or identified) signal strength of the neighboring cell meets the pre-defined reselection threshold. For example, the cell reselection unit 308 can be configured to reselect the PC2 neighbor cell (i.e., neighbor cell 106a) when the threshold for PC2 LTE cell is met.

The memory unit 310 is configured to store the instructions to be executed by the processor unit 312. The memory unit 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 310 may, in some examples, be considered a non-transitory storage medium. The term "non-transitory" may indicate that the storage medium is not embodied in a carrier wave or a propagated signal. However, the term "non-transitory" should not be interpreted that the memory unit 310 is non-movable. In some examples, the memory unit 310 can be configured to store larger amounts of information than the memory. In certain examples, a non-transitory storage medium may store data that can, over time, change (e.g., in Random Access Memory (RAM) or cache)

In an embodiment, the memory unit 310 can be configured to maintain a neighbor cell list (or, lookup database) for the neighbor cells whose PC capability has been determined by the PC determination unit 306. For example, if the UE 102 determines that the neighbor LTE cell 106 is available in the neighbor cell list, then the ease already configured reselection limit by 3 dBm; otherwise use standard logic for reelection (as described above).

In an embodiment, the lookup database can be updated runtime when the UE 102 is scanning for the LTE service. Thus, the UE 102 dependency to read SIB information each time (where a periscopic LTE scan) is triggered can therefore be minimized and/or eradicated.

In an embodiment, the Active eHRPD to LTE transition featureworks when the UE 102 is in an eHRPD connected mode, and in connected mode UE 102 can read ORNL messages too. However, ORNL messages are ignored if read in eHRPD connected mode.

In an embodiment, ORNL message has "PeMax" optional field, which determines Max power at which UE can transmit in the LTE NCell. The UE 102 can use this field to determine if the neighbor cell 106 supports PC2 or not.

In an embodiment, if the LTE scan is triggered as per Active eHRPD to LTE transition (connected mode), then the UE 102 determines if the target cell supports PC2 or not. If the neighbor cell 106 supports PC2, then configured reselection limit is relaxed by 3 dBm.

Figure 4:
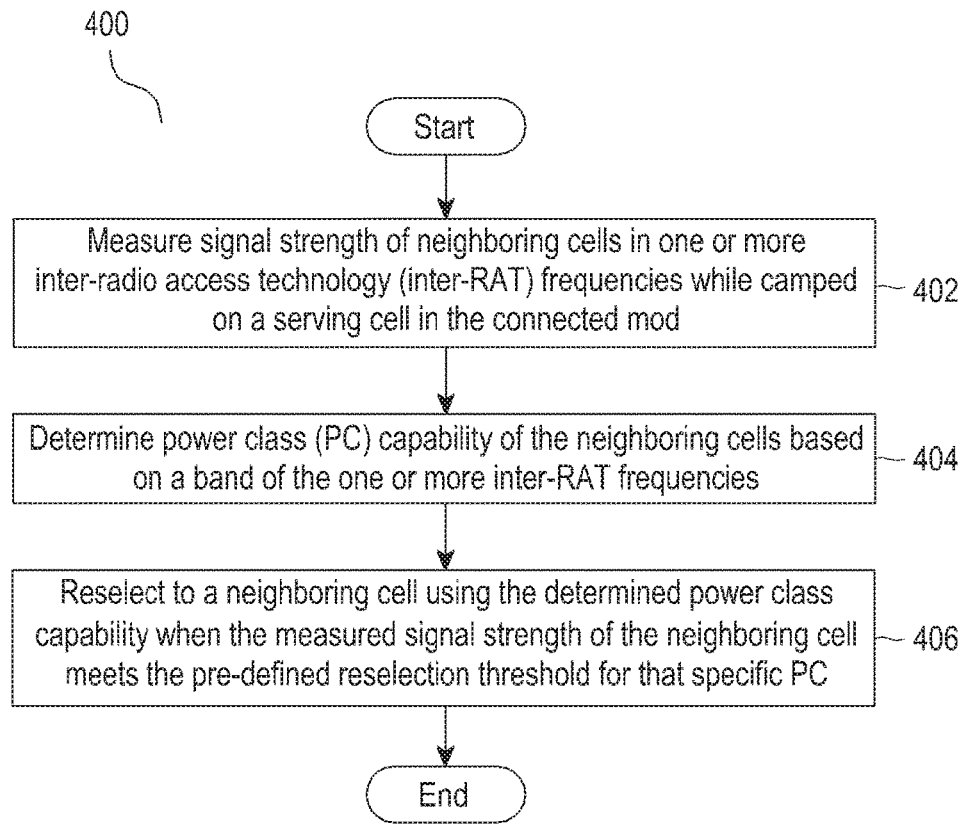
FIG. 4 is a flow diagram illustrating a method for cell reselection by the UE in the connected mode, according to embodiments as disclosed herein.

FIG. 4 is a flow diagram illustrating a method for cell reselection by the UE in a connected mode, according to embodiments as disclosed herein.

Referring to FIG. 4, at step 402, the method includes measuring signal strength of the neighboring cell 106 in one or more inter-radio access technology (inter-RAT) frequencies while camped on the serving cell 104 in the connected mode. In an embodiment, the method allows the UE 102 to measure the signal strength of the neighboring cell 106 in one or more inter-radio access technology (inter-RAT) frequencies while camped on the serving cell 104 in the connected mode.

Further, at step 404, the method includes determining the PC capability of the neighboring cell 106 based on the band of the one or more inter-RAT frequencies. In an embodiment, the method allows the UE 102 to determine the PC capability of the neighboring cell 106 based on the band of the one or more inter-RAT frequencies.

Furthermore, at step 406, the method includes reselecting to the neighboring cell 106 using the determined PC capability when the measured signal strength of the neighboring cell 106 meets the pre-defined reselection threshold for that specific power class. In an embodiment, the method allows the UE 102 to reselect to the neighboring cell 106 using the determined PC capability when the measured signal strength of the neighboring cell 106 meets the pre-defined reselection threshold for that specific PC.

Figure 5:
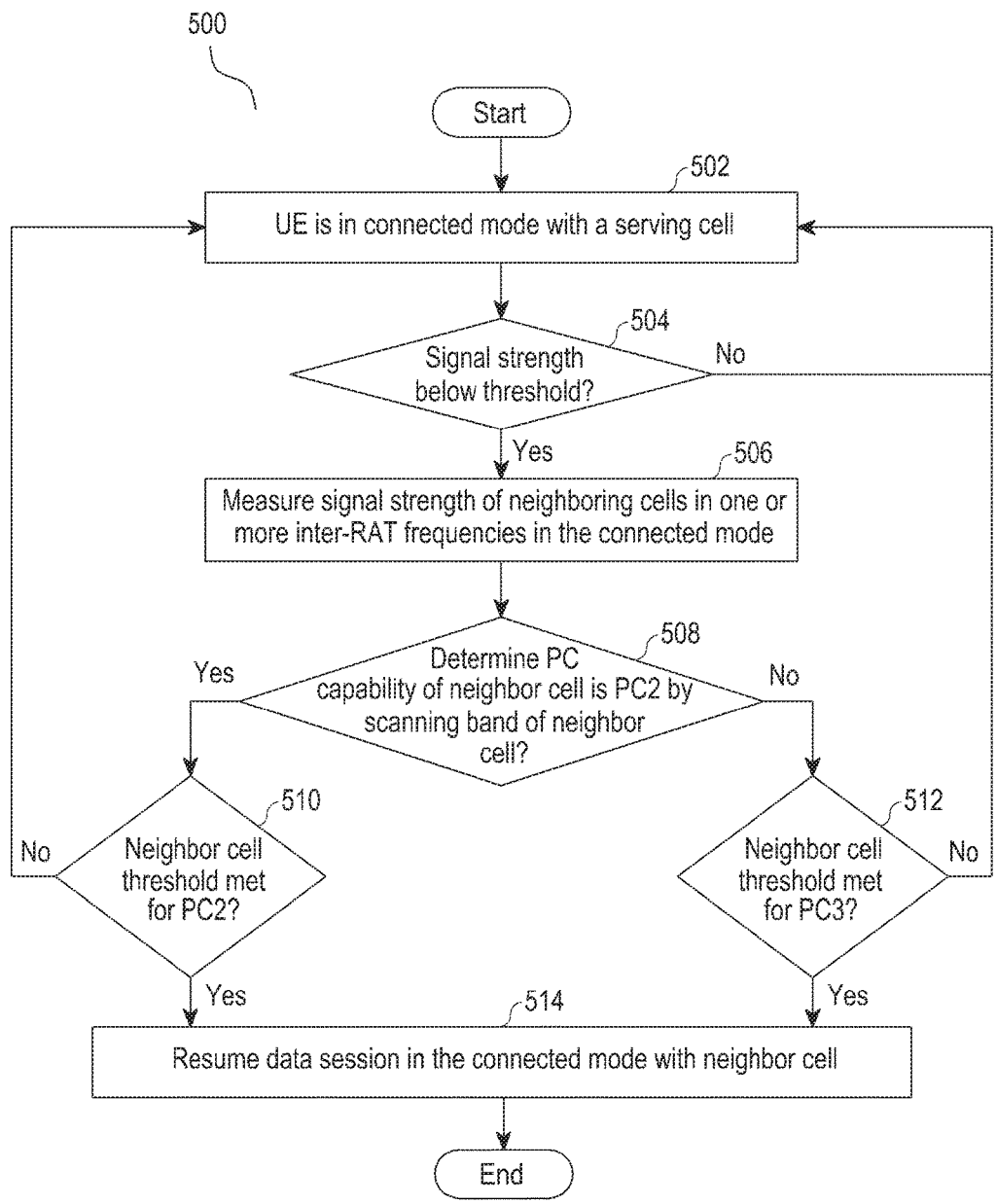
FIG. 5 is a flow diagram illustrating a method for cell reselection by the LTE by scanning a band of neighboring cells, according to embodiments as disclosed herein.

FIG. 5 is a flow diagram 500 illustrating a method for cell reselection by the UE 102 by scanning band of the neighboring cell 106, according to embodiments as disclosed herein.

Referring to FIG. 5, at step 502, the UE 102 is in connected mode with the serving cell 104 supporting the 3G eHRPD network. At step 504, the method includes determining whether the eHRPD signal strength is below the threshold. The threshold value for the signal strength threshold can be decided by network operators based on the deployment. It should be noted that the threshold value is configurable and is pre-configured on the UE 102 as per requirements of the network operators. In an embodiment, the method allows the UE 102 to determine whether the eHRPD signal strength is below the threshold.

If at step 504, if the UE 102 determines that the eHRPD signal strength is not below the threshold, then the UE 102 loops back to perform the method of step 502.

If at step 504, the UE 102 determines that the eHRPD signal strength is below the threshold, then the UE 102, at step 506, can be configured to measure signal strength of the neighboring cell 106 in one or more inter-RAT frequencies.

Further, at step 508, the method includes determining whether the neighbor cell 106 is PC2 capable. In an embodiment, the method for determining the PC2 capable LTE includes scanning the band of the neighboring cell 106. In an embodiment, the method allows the UE 102 to determine whether the neighbor cell 106 is PC2 capable.

If at step 508, the UE 102 determines that the neighbor cell 106 is PC2 capable, then at step 510, the method includes determining whether the neighbor cell 106 threshold for is met. If at step 510, the UE 102 determines that the neighbor cell 106 threshold for PC2 is met, then at step 514, the UE 102 resumes the data session in LTE. If at step 510 the UE 102 determines that the neighbor cell 106 threshold for PC2 is not met, then the method loops back to step 502.

If at step 508, the UE 102 determines that the neighbor cell 106 is not PC2 capable LTE, then at step 512, the method includes determining whether the neighbor cell 106 threshold for PC3 is met. If at step 512, the UE 102 determines that the neighbor cell 106 threshold for PC3 is met, then at step 514, the UE 102 resumes the data session in LTE. However, as detailed above, the LTE RSRP transition limits are not relaxed in case of PC3 LTE cell. If at step 512 the UE 102 determines that the neighbor cell 106 threshold for PC3 is not met, then the method loops back to step 502.

Figure 6:
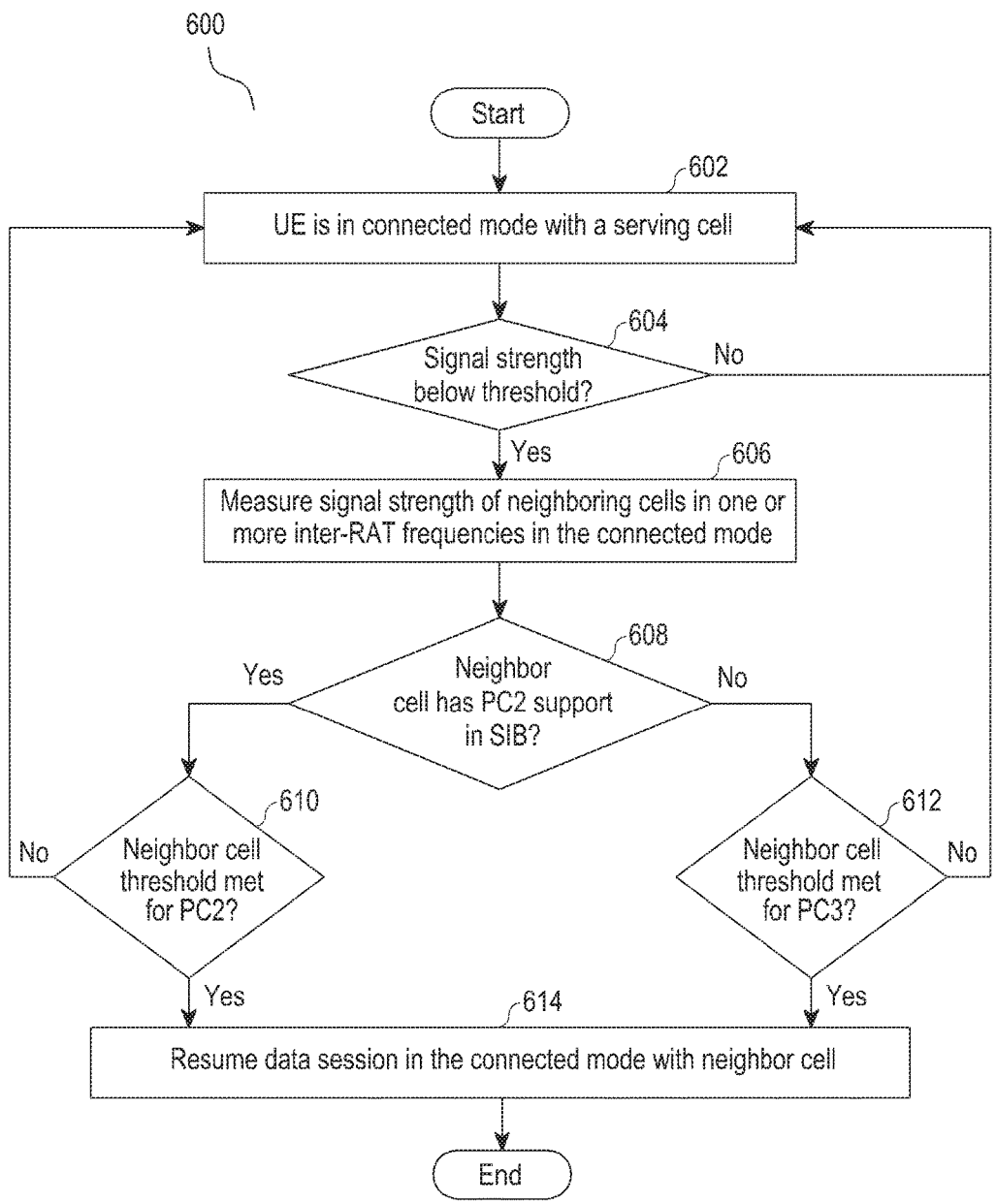
FIG. 6 is a flow diagram illustrating a method for cell reselection by the UE in a connected mode by determining PC2 support in SIB message, according to embodiments as disclosed herein.

FIG. 6 is a flow diagram 600 illustrating a method for cell reselection by the UE 102 in the connected mode by determining PC2 support in SIB message, according to embodiments as disclosed herein.

Referring to FIG. 6, at step 602, the UE 102 is in connected mode with the serving cell 104 supporting the 3G eHRPD network. At step 504, the method includes determining whether the eHRPD signal strength is below the threshold. In an embodiment, the method allows the UE 102 to determine whether the eHRPD signal strength is below the threshold.

If at step 604, if the LTE 102 determines that the eHRPD signal strength is not below the threshold, then the UE 102 loops back to perform the method of step 602.

If at step 604, the UE 102 determines that the eHRPD signal strength is below the threshold, then the UE 102, at step 606, can be configured to measure signal strength of the neighboring cell 106 in one or more inter-RAT frequencies.

Further, at step 608, the method includes determining whether the neighbor cell 106 has PC2 support in SIB. In an embodiment, the method the UE 102 can be configured to check/read the SIB message of the neighbor cell 106 for determining whether the neighbor cell 106 has PC2 support.

If at step 608, the UE 102 determines, using SIB, that the neighbor cell 106 supports the PC2, then at step 610, the method includes determining whether the neighbor cell 106 threshold for PC2 is met. If at step 610, the UE 102 determines that the neighbor cell 106 threshold for PC2 is met, then at step 614, the UE 102 resumes the data session in connected with the neighbor cell 106 (i.e., the neighbor cell 106a). If at step 610 the UE 102 determines that the neighbor cell 106 threshold for PC2 is not met, then the method loops back to step 602.

If at step 608, the method determines, using SIB that the neighbor cell 106 does not support the PC2, then at step 612, the method includes determining whether the neighbor cell 106 threshold for PC3 is met. If at step 612, the UE 102 determines that the neighbor cell 106 threshold for P3 is met, then at step 614, the UE 102 resumes the data session with the neighbor cell 106 (i.e., the neighbor cell 106b). However, as detailed above, the LTE RSRP transition limits are not relaxed in case of PC3 LTE cell. If at step 612 the UE 102 determines that the neighbor cell 106 threshold for PC3 is not met, then the method loops back to step 602.

Figure 7:
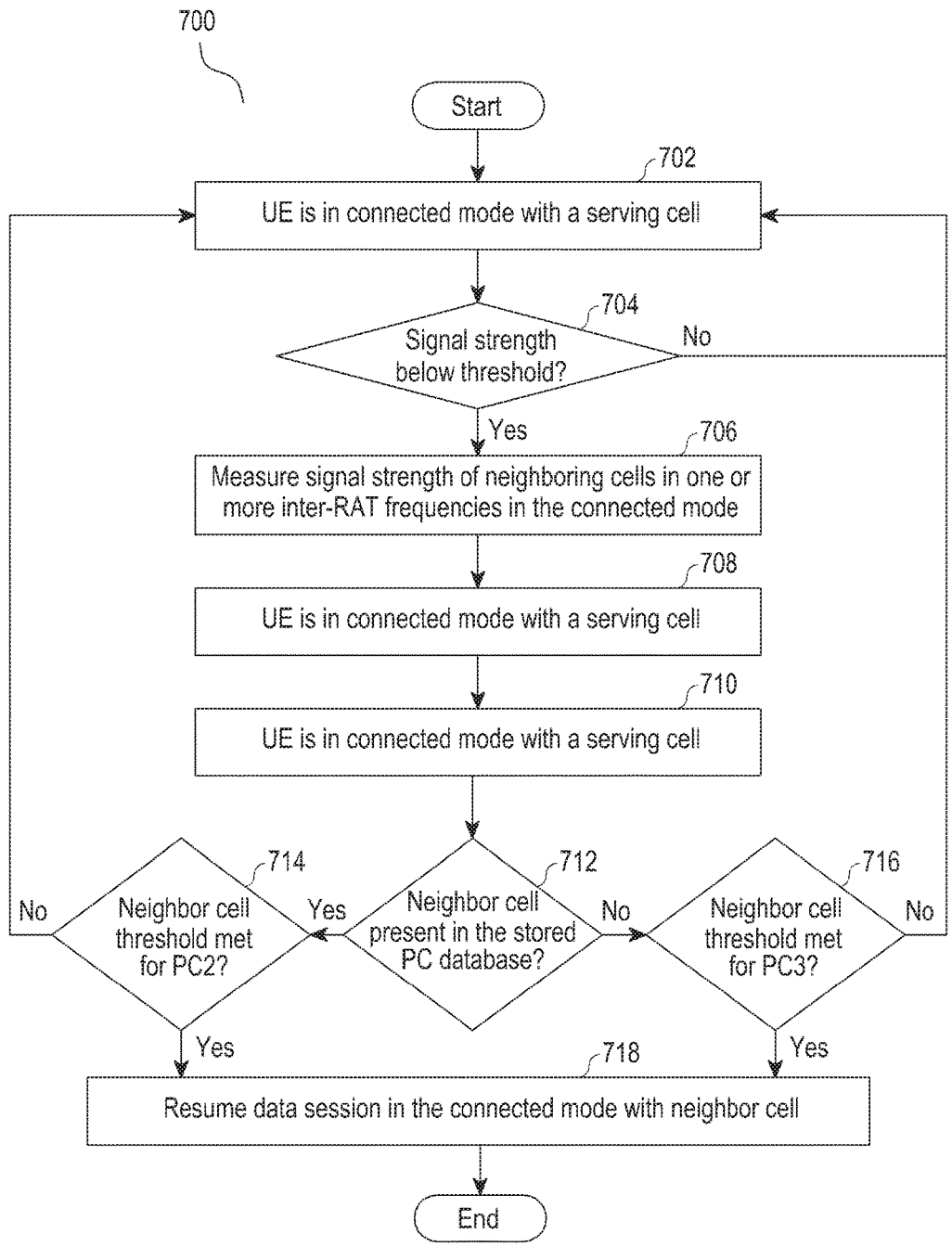
FIG. 7 is a flow diagram illustrating a method for cell reselection by the UE in a connected mode using LTE PC2 cell lookup database, according to embodiments as disclosed herein.

FIG. 7 is a flow diagram 700 illustrating a method for cell reselection by the UE in a connected mode using LTE PC2 cell lookup database, according to embodiments as disclosed herein.

Referring to FIG. 7, at step 702, the UE 102 is in connected mode with the serving cell 104 supporting the 3G eHRPD network. At step 704, the method includes determining whether the eHRPD signal strength is below the threshold). In an embodiment, the method allows the UE 102 to determine whether the eHRPD signal strength meets the threshold.

If at step 704, if the UE 102 determines that the eHRPD signal strength is not below the threshold, then the UE 102 loops back to perform the method of step 702.

If at step 704, the UE 102 determines that the eHRPD signal strength is below the threshold, then the UE 102, at step 706, can be configured to measure signal strength of the neighboring cell 106 in one or more inter-RAT frequencies.

Further, at step 708, the method includes determining PC capability by scanning band of neighboring cell 106. In an embodiment, the method the UE 102 to determine the PC capability by scanning band of neighboring cell 106.

Further, at step 710, the method includes maintaining the determined PC capability of the neighboring cell 106 in a lookup database. In an embodiment, the method the UE 102 to maintain the determined PC capability of the neighboring cell 106 in the lookup database. In an embodiment, the UE 102 can be configured to maintain the lookup database of LTE cells in PC2_db that supports PC2. The lookup database can be updated by the mobile network operator (MNO) or can be updated locally as soon as the UE 102 detects the neighbor LTE cell 106 as PC2 capable cell. During mobility, at step 712, the UE 102 determines whether the neighbor LTE cell 106 (maintained in the lookup database) is available in the neighbor cell list of the UE 102. In an embodiment, the UE 102 to determine whether the neighbor LTE cell 106 (maintained in the lookup database) in available in any of the neighbor list.

If at step 712, the UE 102 determines the availability of the neighbor LTE cell 106 (as maintained in the lookup database) in the neighbor cell list of the UE 102 then, at step 714, the method includes determining whether the neighbor cell 106 threshold for PC2 is met. If at step 714, the UE 102 determines that the neighbor cell 106 threshold for PC2 is met, then at step 718, the UE 102 resumes the data session in connected with the neighbor cell 106 (i.e., the neighbor cell 106*a*). Thus, the UE 102 can relax Active eHRPD to LTE transition limits. If at step 714 the UE 102 determines that the neighbor cell 106 threshold for PC2 is not met, then the method loops back to step 502.

If at step 712, the UE 102 determines that the neighbor LTE cell 106 (as maintained in the lookup database) in not available in the neighbor cell list of the UE 102 then, at step 716, the method includes determining whether the neighbor cell 106 threshold for PC3 is met. If at step 716, the UE 102 determines that the neighbor cell 106 threshold for PC3 is met, then at step 718, the UE 102 resumes the data session in connected with the neighbor cell 106 (i.e., the neighbor cell 106*b*). However, as detailed above, the LTE RSRP transition limits are not relaxed in case of PC3 LTE cell. If at step 716 the UE 102 determines that the neighbor cell 106 threshold for PC3 is not met, then the method loops back to step 702.

In an embodiment, the lookup database can be associated with the memory unit 310. In another embodiment, the lookup database can be stored in a server and can be remotely accessed by the UE 102 using a network.

Figure 8:
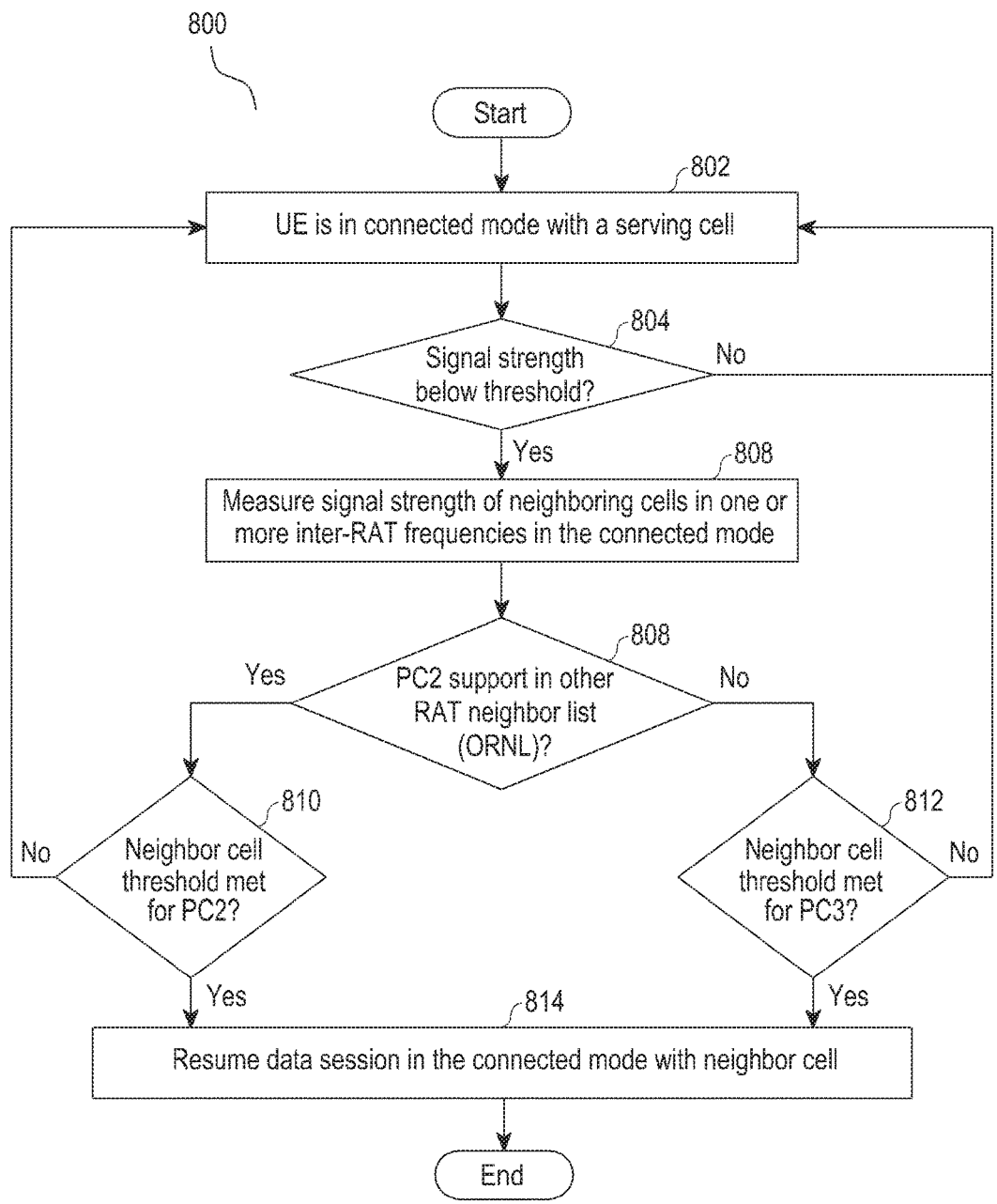
FIG. 8 is a flow diagram illustrating a method for cell reselection by the UE in a connected mode using a 3GPP2 Other RAT Neighbor List (ORNL) indication in a control channel message, according to embodiments as disclosed herein.

FIG. 8 is a flow diagram illustrating a method for cell reselection by the UE in a connected mode using a 3GPP2 Other RAT Neighbor List (ORNL) indication in a control channel message, according to embodiments as disclosed herein.

Referring to the FIG. 8, at step 802, the UE 102 is in connected mode with the serving cell 104 supporting the 3G eHRPD network. At step 804, the method includes determining whether the eHRPD signal strength is below the threshold. In an embodiment, the method allows the UE 102 to determine whether the eHRPD signal strength meets the threshold.

If at step 804, if the UE 102 determines that the eHRPD signal strength is not below the threshold, then the UE 102 loops back to perform the method of step 802.

If at step 804, the UE 102 determines that the eHRPD signal strength is below the threshold, then the UE 102, at step 806, can be configured to measure signal strength of the neighboring cell 106 in one or more inter-RAT frequencies in the connected mode.

Further, at step 808, the method includes determining whether the neighbor cell 106 is PC2 capable LTE from the ORNL message received from the eNB of the serving cell 104. In an embodiment, the method allows the UE 102 to determine whether the neighbor cell 106 is PC2 capable from the ORNL message received in a control channel message from the eNB of the serving cell 104.

If at step 808, the UE 102 determines, from the ORNL, that the neighbor cell 106 is PC2 capable LTE, then at step 810, the method includes determining whether the neighbor cell 106 threshold for PC2 is met. If at step 810, the UE 102 determines that the neighbor cell 106 threshold for PC2 is met, then at step 814, the UE 102 resumes the data session in LTE with the neighbor cell 106. If at step 810 the UE 102 determines that the neighbor cell 106 threshold for PC2 is not met, then the method loops back to step 802

If at step 808, the UE 102 determines, from the ORNL, that the neighbor cell 106 is not PC2 capable LTE, then at step 812, the method includes determining whether the neighbor cell 106 threshold for PC3 is met. If at step 812, the UE 102 determines that the neighbor cell 106 threshold for PC3 is met, then at step 814, the UE 102 resumes the data session in LTE with the neighbor cell 106. However, as detailed above, the LTE RSRP transition limits are not relaxed in case of PC3 LTE cell. If at step 812 the UE 102 determines that the neighbor cell 106 threshold for PC3 is not met, then the method loops back to step 802.

Unlike to conventional methods and conventional systems, if the UE 102 determines that the neighbor cell 106 is PC2 capable LTE cell, then the LTE service acquisition can be faster by camping onto the neighbor cell 106 which PC2 capable LTE cell.

Although the above embodiments describe the transition from eHRPD to LTE network.

The various actions, acts, blocks, steps, or the like in the flow diagrams in the FIGS. 4-8 may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein can be implemented through at least one software program running on at least one hardware device and performing network management functions to control the elements. The elements shown in the FIGS. 1 through 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of various embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for cell reselection by a user equipment (UE) in a connected mode, the method comprising:
   measuring signal strength of neighboring cells in one or more inter-radio access technology (inter-RAT) frequencies while camped on a serving cell in the connected mode;
   determining power class (PC) capability of the neighboring cells based on a band of the one or more inter-RAT frequencies; and reselecting to a neighboring cell using the determined PC capability when the measured signal strength of the neighboring cell meets a pre-defined reselection threshold.

2. The method of claim 1, wherein determining the PC capability of the neighboring cells comprises scanning a band corresponding to an Evolved Absolute Radio Frequency Channel Number (EARFCN) of the neighboring cells.

3. The method of claim 2, comprising:
storing the determined PC capability of the neighboring cells, and
reselecting the neighboring cell using the stored PC capability of the neighboring cell.

4. The method of claim 1, wherein determining the PC capability of the neighboring cells comprises:
acquiring System Information Block Type (SIB) from the neighboring cell; and
reading the SIB to determine the PC capability of the neighboring cell in the SIB.

5. The method of claim 1, wherein determining the PC capability of the neighboring cells comprises:
receiving a control channel message including an other RAT neighbor list (ORNL) message in the connected mode from a base station of the serving cell; and
reading the ORNL message to determine the PC capability of the neighboring cells.

6. The method of claim 1, wherein a signal strength threshold for reselection to the neighboring cell is reduced by determining PC capability of the neighboring cells.

7. The method of claim 1, comprising:
storing the determined PC capability of the neighboring cells, and
reselecting the neighboring cell using the stored PC capability of the neighboring cell.

8. A User Equipment (UE) for cell reselection in a connected mode, the UE comprising:
a memory configured to store data; and
at least one processor configured to:
identify signal strength of neighboring cells in one or more inter-radio access technology (inter-RAT) frequencies while camped on a serving cell in the connected mode,
determine power class capability of the neighboring cells based on a band of the one or more inter-RAT frequencies, and
control to reselect to a neighboring cell sing the determined power class capability when the identified signal strength of the neighboring cell meets a pre-defined reselection threshold.

9. The UE of claim 8, wherein the at least one processor is configured to determine the PC capability of the neighboring cells by controlling to scan a band corresponding to an Evolved Absolute Radio Frequency Channel Number (EARFCN) of the neighboring cells.

10. The UE of claim 9, wherein the at least one processor is further configured to:
control to store the determined PC capability of the neighboring cells, and
control to reselect to the neighboring cell using the stored PC capability of the neighboring cell.

11. The UE of claim 8, wherein to determine the PC capability of the neighboring cells, the at least one processor is configured to:
control to acquire System Information Block Type (SIB) from the neighboring cell; and
control to read the SIB to determine the PC capability of the neighboring cell in the SIB.

12. The UE of claim 8, wherein to determine the PC capability of the neighboring cells, the at least one processor is further configured to:
control to receive a control channel message including an other RAT neighbor list (ORNL) message in the connected mode from a base station of the serving cell; and
control to read the ORNL message to determine the PC capability of the neighboring cells.

13. The UE of claim 8, wherein a signal strength threshold for reselection to the neighboring cell is reduced by determining PC capability of the neighboring cells.

14. The UE of claim 8, wherein the at least one processor is further configured to:
control to store the determined PC capability of the neighboring cells, and
control to reselect to the neighboring cell using the stored PC capability of the neighboring cell.

15. A system, comprising:
a User Equipment (UE) for cell reselection in a connected mode, the UE comprising:
a memory configured to store data; and
at least one processor configured to:
identify signal strength of neighboring cells in one or more inter-radio access technology (inter-RAT) frequencies while camped on a serving cell in the connected mode,
determine power class capability of the neighboring cells based on a band of the one or more inter-RAT frequencies, and
control to reselect to a neighboring cell using the determined power class capability when the identified signal strength of the neighboring cell meets a pre-defined reselection threshold.

16. The system of claim 15, wherein to determine the PC capability of the neighboring cells, the at least one processor is further configured to control to scan a band corresponding to an Evolved Absolute Radio Frequency Channel Number (EARFCN) of the neighboring cells.

17. The system of claim 16, wherein the at least one processor is further configured to:
control to store the determined PC capability of the neighboring cells, and
control to reselect to the neighboring cell using the stored PC capability of the neighboring cell.

18. The system of claim 15, wherein to determine the PC capability of the neighboring cells, the at least one processor is further configured to:
control to acquire System Information Block Type (SIB) from the neighboring cell; and
control to read the SIB to determine the PC capability of the neighboring cell in the SIB.

19. The system of claim 15, wherein to determine the PC capability of the neighboring cells, the at least one processor is further configured to:
control to receive a control channel message including an other RAT neighbor list (ORNL) message in the connected mode from a base station of the serving cell; and
control to read the ORNL message to determine the PC capability of the neighboring cells.

20. The system of claim 15, wherein a signal strength threshold for reselection to the neighboring cell is reduced by determining PC capability of the neighboring cells.

* * * * *